(12) United States Patent
Toivanen et al.

(10) Patent No.: US 7,996,852 B2
(45) Date of Patent: Aug. 9, 2011

(54) ELECTRONIC DEVICE AND COMPUTER PROGRAM

(75) Inventors: Sami Toivanen, Kiiminki (FI); Tulja Ojala, Oulu (FI)

(73) Assignee: Elektrobit Wireless Communications Oy, Oulu (FI)

( * ) Notice: Subject to any disclaimer, the term of this patent is extended or adjusted under 35 U.S.C. 154(b) by 910 days.

(21) Appl. No.: 11/953,156

(22) Filed: Dec. 10, 2007

(65) Prior Publication Data

US 2008/0155569 A1 Jun. 26, 2008

(30) Foreign Application Priority Data

Dec. 22, 2006 (FI) .................... PCT/FI2006/050584

(51) Int. Cl.
*G06F 13/00* (2006.01)
(52) U.S. Cl. .................... 719/321; 719/327; 719/328
(58) Field of Classification Search .................. 719/321, 719/327, 328
See application file for complete search history.

(56) References Cited

U.S. PATENT DOCUMENTS

| 5,675,795 | A | | 10/1997 | Rawson et al. | |
|---|---|---|---|---|---|
| 5,815,682 | A | * | 9/1998 | Williams et al. | ................ 703/25 |
| 6,671,745 | B1 | * | 12/2003 | Mathur et al. | ................ 719/328 |
| 7,603,484 | B2 | * | 10/2009 | Dai et al. | ........................ 710/5 |
| 2003/0101290 | A1 | | 5/2003 | Lin et al. | |
| 2004/0216145 | A1 | | 10/2004 | Wong et al. | |
| 2005/0086665 | A1 | | 4/2005 | Matsuura | |
| 2006/0253859 | A1 | | 11/2006 | Dai et al. | |
| 2007/0174515 | A1 | * | 7/2007 | Sinclair et al. | ................ 710/62 |

OTHER PUBLICATIONS

Leslie B. et al., "User-Level Device Drivers: Achieved Performance", Journal of Computer Science and Technology, vol. 20, No. 5, pp. 654-664, Sep. 2005.

* cited by examiner

*Primary Examiner* — Andy Ho
(74) *Attorney, Agent, or Firm* — Hoffmann & Baron, LLP

(57) ABSTRACT

An electronic device comprises software including an operating system kernel and a device controller for controlling a hardware component, wherein the device controller is external to the operating system kernel. The software further comprises a communication driver integrated into the operating system kernel, the communication driver 206) including encoded instructions for providing communication between the at least one device controller and the operating system kernel.

13 Claims, 1 Drawing Sheet

ELECTRONIC DEVICE AND COMPUTER PROGRAM

CROSS-REFERENCE TO RELATED APPLICATION

This application claims priority based on International Patent Application No. PCT/FI2006/050584, filed Dec. 22, 2006, which is incorporated herein by reference.

BACKGROUND OF THE INVENTION

1. Field of the Invention

The invention relates to an electronic device and a computer program.

2. Description of the Related Art

The size of software run in electronic devices, such as mobile phones, has substantially increased due to the improved computing and data storing capacity. Furthermore, the life cycle of the electronic devices has shortened, thus putting pressure on the electronics corporations to release new models of the electronic devices to the market as frequently as possible.

Commercial reasons cause an increased time pressure in the research and development organizations of electronics corporations. The time pressure results in that the software of the electronic devices be released more frequently during a product development process. A typical software package of the electronic device typically comprises hundreds of thousands of lines of code, which requires a substantial computational effort and time during processing, such as compiling, debugging and testing. Especially, compiling the operating system kernel may take several hours.

Therefore, it is useful to consider techniques for reducing the time spent on processing the software of electronic devices.

SUMMARY OF THE INVENTION

An object of the invention is to provide an improved electronic device and computer program. According to an aspect of the invention, there is provided an electronic device comprising software including: an operating system kernel; at least one device controller for controlling at least one hardware component, the at least one device controller being external to the operating system kernel; and at least one communication driver integrated into the operating system kernel, the at least one communication driver including encoded instructions for providing communication between the at least one device controller and the operating system kernel.

According to a second aspect of the invention, there is provided a computer program comprising encoded instructions for executing a computer process in a digital processor of an electronic device, the computer program comprising: an operating system kernel; at least one device controller for controlling at least one hardware component, the at least one device controller being external to the operating system kernel; and at least one communication driver integrated into the operating system kernel, the at least one communication driver including encoded instructions for providing communication between the at least one device controller and the operating system kernel.

The invention provides several advantages.

In an embodiment of the invention, software components of the device controllers are excluded from the operating system kernel, thus reducing the need for compiling, for example, the operating system kernel when new software is released. As the functionality of the device controllers is located outside the operating system kernel, such as in a normal application area, the development speed is greatly improved by the use of simple and economical tools, less restrictive environment and easy deployment of components.

BRIEF DESCRIPTION OF THE DRAWINGS

In the following, the invention will be described in greater detail with reference to the embodiments and the accompanying drawings, in which.

DETAILED DESCRIPTION OF THE PREFERRED EMBODIMENTS.

Figure 1:
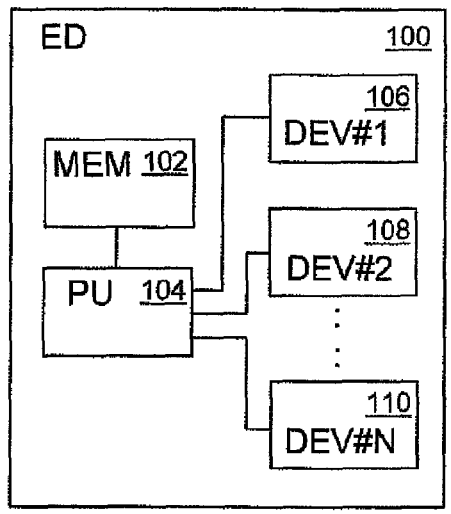
FIG. 1 shows an example of the physical structure of an electronic device.

With reference to FIG. 1, examine an example of a physical structure of an electronic device (ED) 100.

FIG. 1 shows a processing unit (PU) 104, which includes a digital processor. The processing unit 104 executes computer processes encoded in computer programs stored in a memory unit (MEM) 102.

FIG. 1 further shows hardware components 106, 108, 110, herein also referred to as devices (DEV#1, DEV#2, DEV#N) 106, 108, 110.

The devices 106 to 110 form the physical part of the electronic device 100, including the digital circuitry.

The device 106 to 110 may be internal or external to the electronic device 100.

A device 106 to 110 may be a user interface device, such as an input device and/or an output device. A typical input device is a keyboard, keypad and a pointing device, such as a mouse or navigation member. A typical output device is a display and an audio device.

In an embodiment of the invention, the device 106 to 110 is a camera, memory card and/or a sensor.

In an embodiment of the invention, the device 106 to 110 is a heart rate monitor.

In an embodiment of the invention, the device 106 to 110 is a radio channel measurement device.

In an embodiment of the invention, the device 106 to 110 is a channel simulator.

In an embodiment of the invention, the device 106 to 110 is a modem implementing the radio interface of a wireless telecommunication system. The wireless telecommunication system may be a GSM based system (Global System for Mobile Communications) or UMTS (Universal Mobile Telecommunication System), for example. The invention is not however, restricted to these systems.

In an embodiment of the invention, the electronic device 100 is a wireless communication device comprising means for communication in the wireless communication system, such as a cellular telecommunications system, WLAN (Wireless Local Access Network) and/or WPAN (Wireless Personal Area Network). The electronic device 100 may be a mobile phone, a PDA (Personal Digital Assistant) and/or a radio modem, for example.

Figure 2:
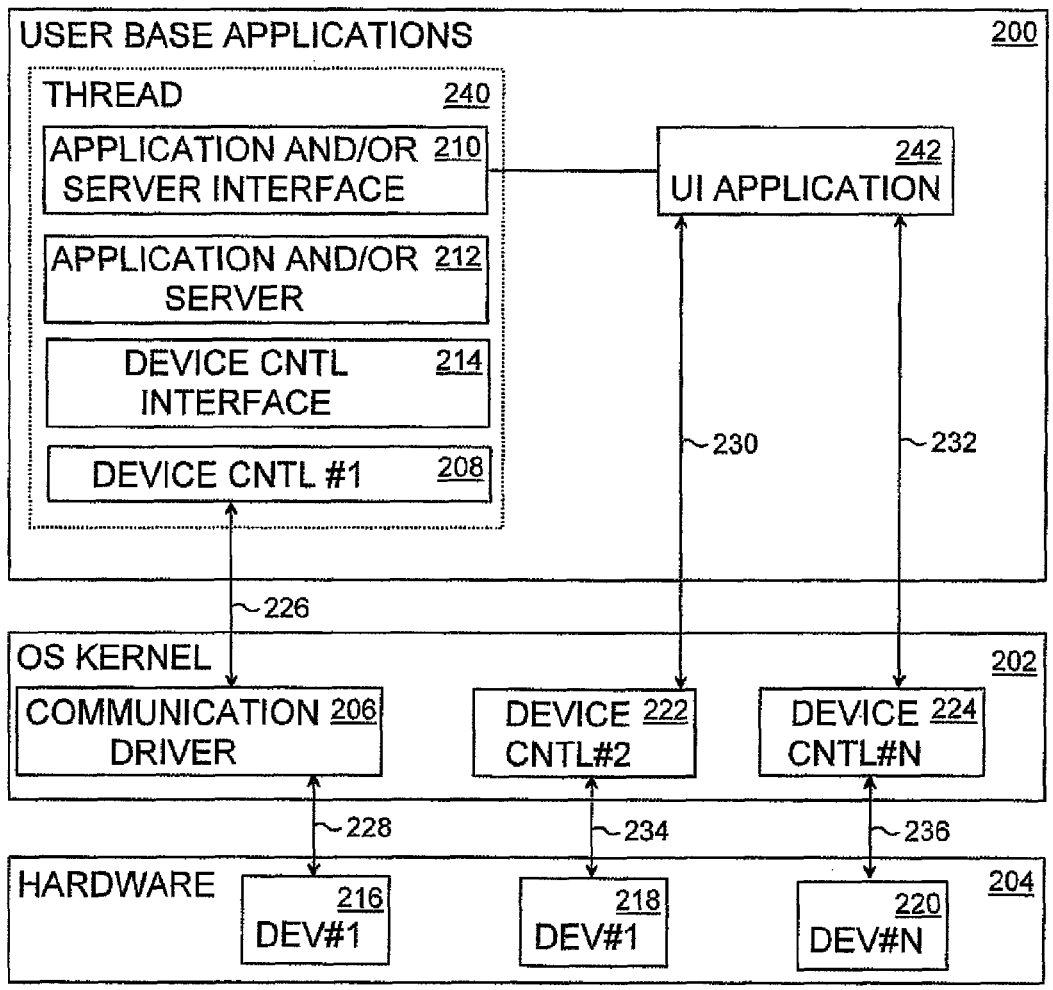
FIG. 2 illustrates an example of the functional structure of an electronic device.

With reference to FIG. 2, the functional structure of an electronic device 100 comprises user base applications 200, an operating system kernel 202 and hardware 204.

The operating system kernel 202 is the central component of the software of the electronic device 100. The responsibilities of the operating system kernel 202 include, for example, managing the resources of the electronic device 100 and the communication between the hardware 204 and software components, such as the operating system kernel 202 itself and the user base applications 200. The operating system kernel 202 provides with the lowest level of abstraction layer for the resources, such as the memory unit 102 and processing unit 104.

In an embodiment of the invention, the operating system kernel 202 is a Linux kernel. The Linux kernel typically provides with multitask processing capability. Furthermore, the Linux kernel has a modular structure.

The functional structure further comprises device controllers 208, 222, 224. A device controller 208, 222, 224 is a specific type of software, typically developed to control a device 216, 218, 220.

Typically, the device controller 208, 222, 224 provides an interface for communicating data 228, 234, 236 between the device 216, 218, 220 and software, through a specific data bus or communications subsystem which the device 216, 218, 220 is connected to. The device controller 208, 222, 224 may further provide interface for transferring data 230, 232 between the operating system kernel 202 and applications, such as user interface applications 242 of the user base applications 200. The device controller 222, 224 internal to the operating system kernel 202 may also communicate data with the device controller 208 external to the operating system kernel 202 and/or with communication driver 206.

A device controller 222, 224 may be internal to the operating system kernel 202. If a great number of device controllers 222, 224 are internal to the operating system kernel 202, the file size to be compiled increases, thus resulting in an increased time required for the compilation process. Furthermore, the inclusion of the device controllers in the operating system kernel 202 may result in unnecessary need to compile the entire operating system kernel 202, if the modifications of the software are directed to the device controllers 222, 224 only.

The requirement of compiling the entire operating system kernel 202 may be reduced by locating a device controller 208 external to the operating system kernel 202. The operating system kernel 202 may be provided with a communication driver 206 integrated into the operating system kernel 202.

The communication driver 206 includes encoded instructions for providing communication between the device controller 208 and the operating system kernel 202. The need to modify the communication driver 206 during a research and development process of the software is typically lower than that of the device controller 208, and thus it may be sufficient to compile the device controller 208 without processing the software of the operating system kernel 202. This results in a substantial reduction in the time required for compiling.

The communication driver 206, also referred to as a pipe driver, is equivalent to a driver when observed from outside of the operating system kernel 202. The data 226, 228 communicated by the communication driver 206 may include any data, such as commands, used for controlling the device 216. The data 226, 228 communicated by the communication driver 206 may also include raw data generated in the device 216. The contents of the data 228 may be irrelevant to the communication driver as long as the contents are relevant to the device controller 208 and the device 216.

FIG. 2 further shows computer processes which are executed in the same thread 240 of execution as are executed processes of the device controller 208. Such computer processes are related to, for example, application and/or server interface 210, application and/or server 212 itself and a device control interface 214.

In an embodiment of the invention, the communication driver 206 comprises encoded instructions for providing communication between the operating system kernel 202 and computer processes executed in the same thread 240 of execution as the device controller 208 is executed. This arrangement reduces the number of communication drivers in the operating system kernel 202 and simplifies the software. This arrangement further has security aspects, since the communication driver 206 may further check which process is entitled to communicate with a specific hardware component.

Coded instructions for constructing functional structure of FIG. 2 may be included in software. The functional structure of FIG. 2 may be realized by compiling software and/or software components.

The use of the communication driver 206 further enables using improved data flow handling, which avoids unnecessary and time-expensive context switches when transmitting and further processing data.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. An electronic device, comprising software including an operating system kernel, the software comprising:
    at least one device controller for controlling at least one hardware component, the at least one device controller being external to the operating system kernel such that the device controller can be compiled without processing the operating system kernel; and
    at least one communication driver integrated into the hardware component, the at least one communication driver including encoded instructions for providing communication between the at least one device controller and the hardware component.

2. The electronic device of claim 1, wherein the operating system kernel is a Linux kernel.

3. The electronic device of claim 1, wherein the at least one device controller is not statically linked to libraries used by the operating system kernel.

4. The electronic device of claim 1, wherein the at least one communication driver further comprises encoded instructions for providing communication between the operating system kernel and computer processes executed in the same thread of execution as the at least one device controller is executed.

5. The system of claim 1, wherein the at least one hardware component is a modem implementing the radio interface of a wireless telecommunication system.

6. A computer program comprising encoded instructions for executing a computer process in a digital processor of an electronic device, the computer program comprising an operating system kernel, the computer program comprising:

at least one device controller for controlling at least one hardware component, the at least one device controller being external to the operating system kernel such that the device controller can be compiled without processing the operating system kernel; and at least one communication driver integrated into the hardware component, the at least one communication driver including encoded instructions for providing communication between the at least one device controller and the hardware component.

7. The computer program of claim 6, wherein the operating system kernel is a Linux kernel.

8. The computer program of claim 6, wherein the at least one device controller is not statically linked to libraries used by the operating system kernel.

9. The computer program of claim 6, wherein the at least one communication driver further comprises encoded instructions for providing communication between the operating system kernel and computer processes executed in the same thread of execution as the at least one device controller is executed.

10. The computer program of claim 6, wherein the at least one hardware component is a modem implementing the radio interface of a wireless telecommunication system.

11. A non-transitory computer readable storage medium comprising a computer program comprising instructions that, when executed by a computing device, cause the computing device to:

control at least one hardware component using at least one device controller, the at least one device controller being external to an operating system kernel such that the device controller can be compiled without processing the operating system kernel; and provide communication between the at least one device controller and the hardware component by at least one communication driver, the at least one communication driver being integrated into the hardware component.

12. The non-transitory computer readable storage medium of claim 11, wherein the non-transitory computer-readable storage medium includes at least one of the following media: a computer readable medium, a program storage medium, a record medium, a computer readable memory, a computer readable software distribution package, and a computer readable compressed software package.

13. The non-transitory computer-readable distribution medium of claim 11, wherein the at least one hardware component is a modem implementing the radio interface of a wireless telecommunication system.

\* \* \* \* \*